United States Patent
Wang

(10) Patent No.: US 10,031,777 B2
(45) Date of Patent: Jul. 24, 2018

(54) METHOD AND SYSTEM FOR SCHEDULING VIRTUAL MACHINES IN INTEGRATED VIRTUAL MACHINE CLUSTERS

(71) Applicant: Sangfor Technologies Company Limited, Shenzhen (CN)

(72) Inventor: Zheng Wang, Shenzhen (CN)

(73) Assignee: SANGFOR TECHNOLOGIES INC., Shenzhen (CN)

( * ) Notice: Subject to any disclaimer, the term of this patent is extended or adjusted under 35 U.S.C. 154(b) by 167 days.

(21) Appl. No.: 14/940,286

(22) Filed: Nov. 13, 2015

(65) Prior Publication Data

US 2016/0139957 A1 May 19, 2016

(30) Foreign Application Priority Data

Nov. 14, 2014 (CN) .......................... 2014 1 0650493

(51) Int. Cl.
*G06F 9/455* (2018.01)
*G06F 9/50* (2006.01)

(52) U.S. Cl.
CPC ............ *G06F 9/50* (2013.01); *G06F 9/45554* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 8,141,090 B1* | 3/2012 | Graupner | ............ | G06F 9/45558 709/225 |
| 8,261,268 B1* | 9/2012 | Forgette | .............. | G06F 9/45558 718/1 |
| 8,458,717 B1* | 6/2013 | Keagy | ....................... | G06F 8/63 718/104 |
| 8,464,250 B1* | 6/2013 | Ansel | ................... | G06F 9/45504 709/220 |
| 8,825,863 B2* | 9/2014 | Hansson | ................ | G06F 9/5044 709/223 |
| 9,081,617 B1* | 7/2015 | Pendharkar | ........... | G06F 9/5044 |
| 9,323,577 B2* | 4/2016 | Marr | | |
| 9,514,485 B1* | 12/2016 | De Kadt | ............ | G06Q 30/0283 |
| 9,641,385 B1* | 5/2017 | Daniel | ................ | H04L 41/0806 |
| 2010/0100881 A1* | 4/2010 | Shigeta | ............... | G06F 11/2247 718/1 |
| 2010/0223364 A1* | 9/2010 | Wei | .......................... | H04L 29/04 709/220 |
| 2011/0022574 A1* | 1/2011 | Hansen | ............... | G06F 11/2097 707/698 |
| 2011/0099187 A1* | 4/2011 | Hansen | ............... | G06F 11/2097 707/769 |

(Continued)

*Primary Examiner* — Hiren Patel
(74) *Attorney, Agent, or Firm* — Anova Law Group, PLLC

(57) ABSTRACT

A method for scheduling virtual machines in a virtual machine cluster includes obtaining a filename of a target virtual machine when a user requests to start the target virtual machine; inquiring, based on the filename of the target virtual machine, a storage module or a database to acquire one or more nodes where copies of the target virtual machine are located; selecting, from the acquired one or more nodes, a node with a highest score as a target node having a copy of the target virtual machine; and running the copy of the target virtual machine on the selected target node with the highest score.

16 Claims, 5 Drawing Sheets

(56) References Cited

U.S. PATENT DOCUMENTS

| | | | |
|---|---|---|---|
| 2012/0185426 A1* | 7/2012 | Mori | G06F 3/061 707/609 |
| 2012/0233668 A1* | 9/2012 | Leafe | G06F 9/44526 726/4 |
| 2012/0331463 A1* | 12/2012 | Orveillon | G06F 8/63 718/1 |
| 2013/0036323 A1* | 2/2013 | Goose | G06F 11/1484 714/4.11 |
| 2013/0091577 A1* | 4/2013 | McGinley | G06F 21/00 726/25 |
| 2013/0097601 A1* | 4/2013 | Podvratnik | G06F 9/5027 718/1 |
| 2013/0117359 A1* | 5/2013 | Husain | G06F 9/445 709/203 |
| 2013/0263119 A1* | 10/2013 | Pissay | G06F 9/45558 718/1 |
| 2014/0026000 A1* | 1/2014 | Ma | H04L 29/14 714/47.1 |
| 2014/0059310 A1* | 2/2014 | Du | G06F 3/065 711/162 |
| 2014/0082165 A1* | 3/2014 | Marr | G06F 9/5044 709/222 |
| 2014/0082699 A1* | 3/2014 | Eicken | G06F 21/53 726/4 |
| 2014/0196032 A1* | 7/2014 | Gupta | G06F 8/63 718/1 |
| 2014/0222953 A1* | 8/2014 | Karve | G06F 9/455 709/217 |
| 2014/0229936 A1* | 8/2014 | Gaonkar | G06F 9/45558 718/1 |
| 2014/0258483 A1* | 9/2014 | Mai | H04L 67/10 709/223 |
| 2014/0282520 A1* | 9/2014 | Sabharwal | G06F 9/455 718/1 |
| 2015/0067168 A1* | 3/2015 | Hegdal | H04L 47/70 709/226 |
| 2015/0378768 A1* | 12/2015 | Conover | G06F 9/45558 718/1 |
| 2016/0139957 A1* | 5/2016 | Wang | G06F 9/50 718/1 |
| 2016/0162308 A1* | 6/2016 | Chen | G06F 9/45558 718/1 |
| 2016/0266919 A1* | 9/2016 | Wang | G06F 9/4856 |

* cited by examiner

METHOD AND SYSTEM FOR SCHEDULING VIRTUAL MACHINES IN INTEGRATED VIRTUAL MACHINE CLUSTERS

CROSS-REFERENCES TO RELATED APPLICATIONS

This application claims priority of Chinese Patent Application No. 201410650493.3, filed on Nov. 14, 2014, the entire contents of which are hereby incorporated by reference.

FIELD OF THE INVENTION

The present disclosure generally relates to the field of virtual machines and, more particularly, relates to methods and systems for scheduling virtual machines in integrated virtual machine clusters.

BACKGROUND

An integrated virtual machine is a combined operation of a virtualization management software and a storage software on a same physical server, where the storage software utilizes the disk of the server to build a distributed storage system that provides storage services for the virtualization management software. The integrated virtual machine cluster shown in FIG. 1 has a total of four nodes, namely A, B, C and D, respectively. To start a virtual machine, a user needs to select a node to run the virtual machine. The load balance may be achieved mainly based on the processing capability of the CPU, that is, a node may be selected based on the CPU frequency and memory configuration required by a virtual machine. For example, if the CPU frequency and memory configuration of Node B meet the requirements for running a virtual machine VM2, Node B may be selected for running the virtual machine VM2.

However, it is possible that Node B does not have a copy of the virtual machine VM2, and copies of the virtual machine VM2 may be located at Node C and Node D. In this case, the disk reading and writing of the virtual machine VM2 should be made by reading and writing the copies at Node C or Node D across a network. The disk reading and writing (or input and output, IO) across a network may seriously affect the running speed of a virtual machine. If the network broadband capability (for example, 1 Gbps network) is lower than the disk IO capability (for example, 6 Gbps SSD), or the network is at a congestion state, the disk IO across the network may greatly decrease the running speed of a virtual machine.

Two methods are often used to solve this issue. One method is to increase the bandwidth, for example, using a 10 Gbps fiber-optic network. The other method is to use special technology networks, such as RDMA and InfiniBand technologies. However, both methods have the disadvantage of high costs.

The disclosed methods and systems are directed to solve one or more problems set forth above and other problems in the art.

BRIEF SUMMARY OF THE DISCLOSURE

One aspect of the present disclosure includes a method for scheduling virtual machines in an integrated virtual machine cluster. The method includes obtaining a filename of a target virtual machine when a user requests to start the target virtual machine; inquiring, based on the filename of the target virtual machine, a storage module or a database to acquire one or more nodes where copies of the target virtual machine are located; selecting, from the acquired one or more nodes, a node with a highest score as a target node having a copy of the target virtual machine; and running the copy of the target virtual machine on the selected target node with the highest score.

Another aspect of the present disclosure includes a system for scheduling virtual machines in an integrated virtual machine cluster. The system includes a filename acquisition module, a copy inquiry module, a target selection module, and a running module. The filename acquisition module is configured to acquire a filename of a target virtual machine when a user requests to start the target virtual machine. The copy inquiry module is configured to, based on the filename of the target virtual machine, inquire a storage module or a database to acquire one or more nodes where copies of the target virtual machine are located. The target selection module is configured to, from the acquired one or more nodes, select a node with a highest score as a target node having a copy of the target virtual machine. The running module configured to run the copy of the target virtual machine on the selected target node with the highest score.

Another aspect of the present disclosure includes a non-transitory computer-readable medium having computer program. When being executed by a processor, the computer program performs a method for scheduling virtual machines in an integrated virtual machine cluster. The method includes obtaining a filename of a target virtual machine when a user requests to start the target virtual machine; inquiring, based on the filename of the target virtual machine, a storage module or a database to acquire one or more nodes where copies of the target virtual machine are located; selecting, from the acquired one or more nodes, a node with a highest score as a target node having a copy of the target virtual machine; and running the copy of the target virtual machine on the selected target node with the highest score.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 1:
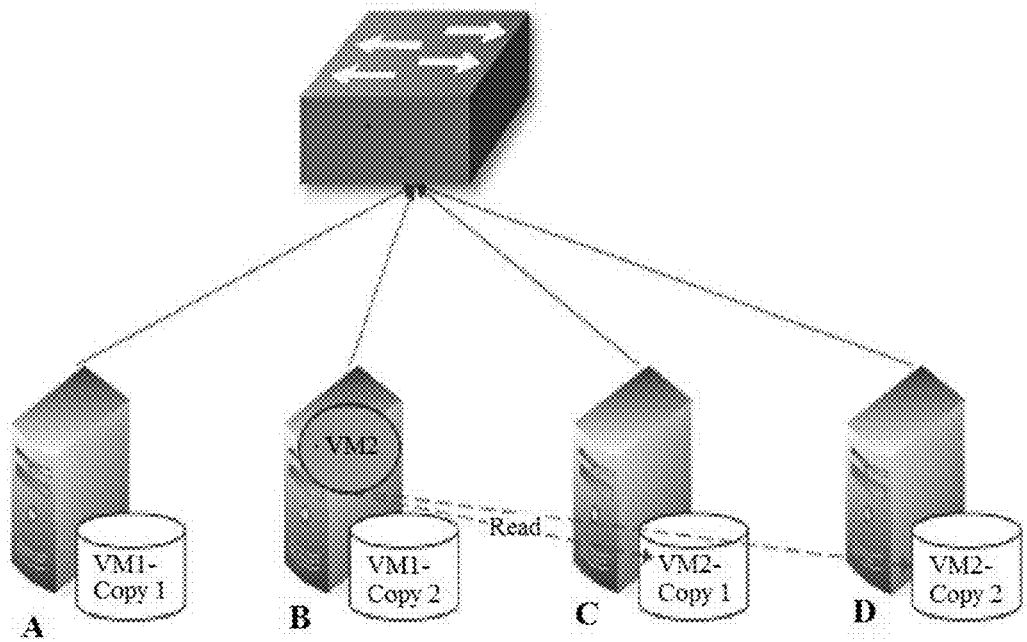
FIG. 1 illustrates a structural diagram of an integrated virtual machine cluster using a conventional method for scheduling virtual machines.
Figure 2:
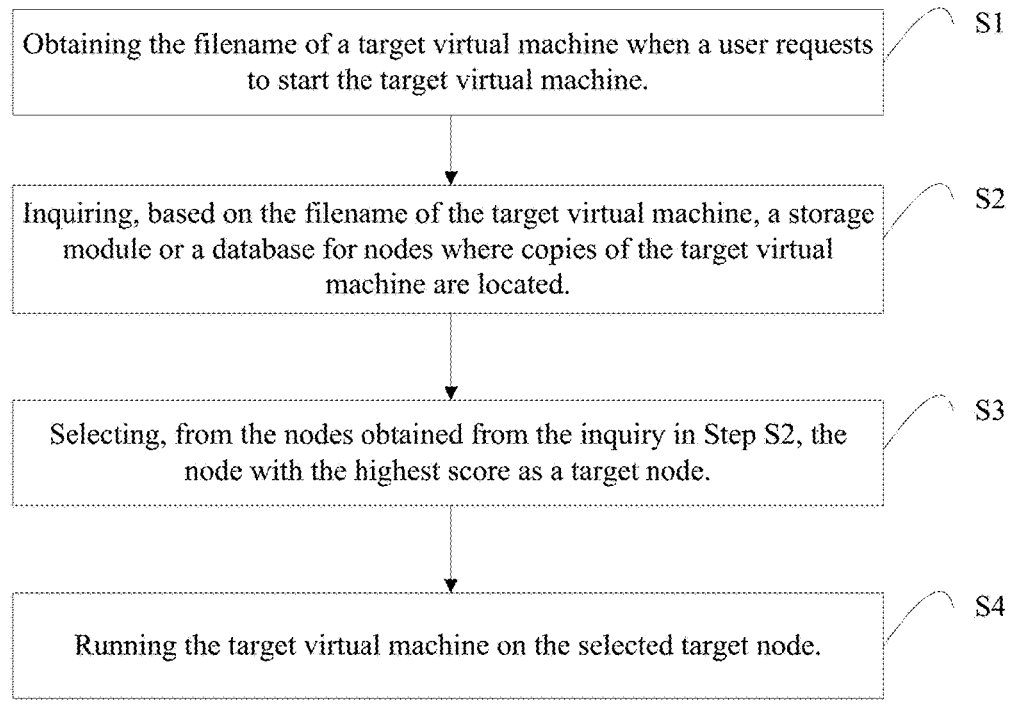
FIG. 2 illustrates a schematic flow chart of an exemplary method for scheduling virtual machines in an integrated virtual machine cluster consistent with the disclosed embodiments.

FIG. 2 illustrates a schematic flow chart of an exemplary method for scheduling virtual machines in an integrated virtual machine cluster. The method for scheduling virtual machines includes following steps.

Step S1: obtaining the filename of a target virtual machine when a user requests to start the target virtual machine. It should be noted that, when a user starts a target virtual machine, the user specifies a target virtual machine corresponding to a filename, although the user may not be aware of where the target virtual machine is located. When the integrated virtual machine receives the instruction of a user to start the target virtual machine, the filename of the target virtual machine can be obtained by the integrated virtual machine receiving the user's request or instruction to start the target virtual machine.

The file of a virtual machine is typically stored on a host computer, usually in a directory created for the virtual machine. A management system may be used for managing the virtual machine files stored in the host computer. After an integrated virtual machine cluster receives a user's request or instruction to start a target virtual machine, the user's request or instruction to start the target virtual machine is transmitted to the management system for managing the virtual machine files stored in the host computer. The management system may determine a directory created for the target virtual machine to be started, and the filename of the target virtual machine to be started can be obtained from the directory.

Step S2: inquiring, based on the filename of the target virtual machine, a storage module or a database for nodes where copies of the target virtual machine are located.

In an integrated virtual machine cluster, virtual machines may be installed on various nodes. A node may be a physical machine or computer for hosting one or more virtual machines. In certain embodiments, a node may also be a virtual machine. One virtual machine may be installed on multiple nodes. If one node fails, the virtual machines installed on the failing nodes may be disabled, but the functions of the integrated virtual machine cluster may keep unaffected.

The information about the virtual machines installed on the nodes of an integrated virtual machine cluster may be stored on a storage module or a database. By inquiring the storage model or the database, based on the filename of the target virtual machine, the nodes where copies of the target virtual machine are installed may be located.

Step S3: selecting, from the nodes obtained from the inquiry in Step S2, the node with the highest score as a target node. The score of a node may be a quantitative indication for the efficiency of running a target virtual machine on the node. The higher the score of a node, the higher the efficiency of running a target virtual machine on the node. The score of a node may be determined by the configurations of the integrated virtual machine cluster and the node.

Step S4: running the target virtual machine on the selected target node.

It should be noted that, as in Step S3, the target node is selected from the nodes obtained from the inquiry in Step S2, a copy of the target virtual machine is installed on the selected target node. Therefore, when the target virtual machine is run on the selected target node, it is not needed to read and write the copies of the target virtual machine stored in the disk across the network, thus saving the network traffic.

Further, as the selected target node has the highest score compared to other nodes installed with copies of the target virtual machine, running the target virtual machine on the selected target node has the highest efficiently.

Figure 3A:
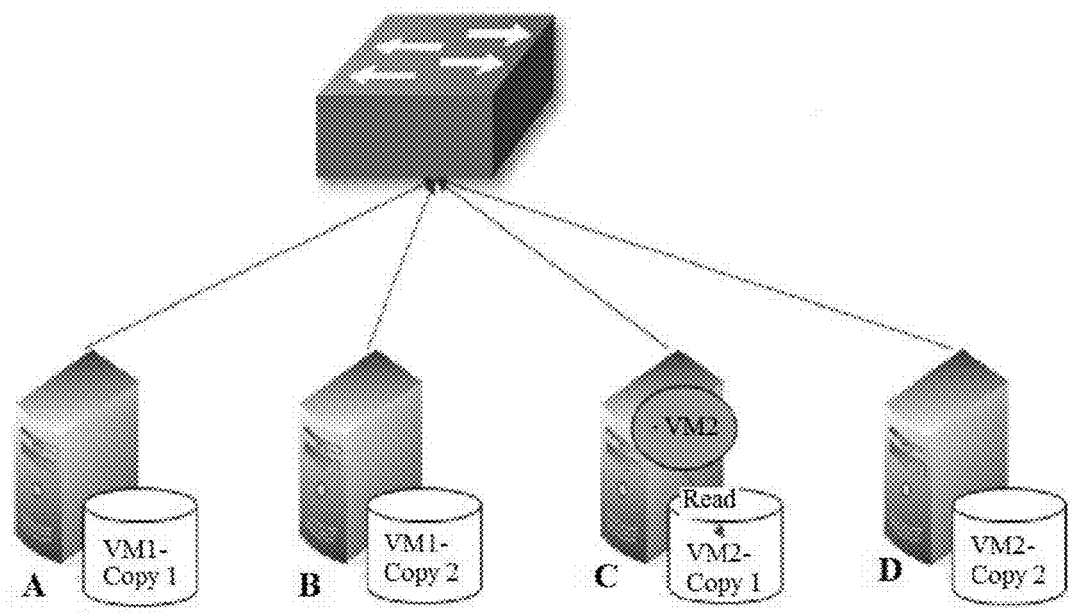
FIG. 3A illustrates a structural diagram of an exemplary integrated virtual machine cluster using a method for scheduling virtual machines consistent with the disclosed embodiments.

FIG. 3A illustrates an exemplary integrated virtual machine cluster using the disclosed method for scheduling virtual machines. As shown in FIG. 3A, there are four nodes, Node A, Node B, Node C, and Node D. A copy of virtual machine VM1 is on Node A, and a second copy of virtual machine VM1 is on Node B. A copy of virtual machine VM2 is on Node C, and a second copy of virtual machine VM2 is on Node D.

In one use-case, the filename of the target virtual machine that the user requests to start is VM2. The filename VM2 of the target virtual machine can be obtained in Step S1 above. Based on the filename VM2 of the target virtual machine, the nodes where the copies of the target virtual machine are located can be inquired from the storage module of the integrated virtual machine cluster.

In this exemplary embodiment, the nodes obtained from the inquiry are Node C and Node D, and the target node is selected from Node C and Node D based on the scores of Node C and Node D. The node with the highest score is selected as the target node. Specially, for both Node C and Node D, a copy of the target virtual machine is installed on each node. The target virtual machine can be run on either Node C or Node D, without the need to read and write the copies of the target virtual machine installed on other nodes in the integrated virtual machine cluster across the network, effectively saving the network traffic.

As shown in FIG. 3A, in this exemplary embodiment, the score of Node C is higher than the score of Node D, that is, running the target virtual machine on Node C is more efficient than running the target virtual machine on Node D. Node C is thus selected as the target node. In this way, the running speed of a virtual machine can be improved without increasing the network bandwidth, and the disk reading ability of a virtual machine can break through the network restrictions, reaching the level of a local disk IO capacity.

Figure 3B:
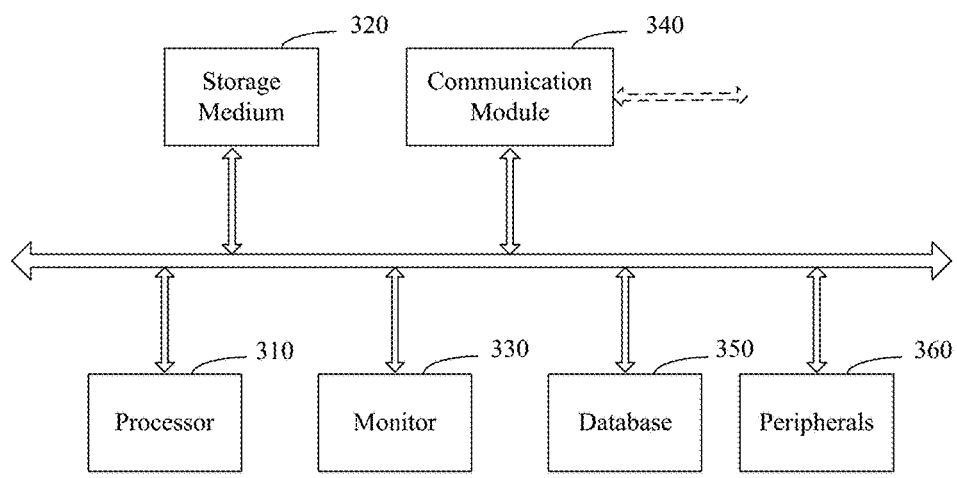
FIG. 3B illustrates an exemplary computing system consistent with the disclosed embodiments.

FIG. 3B illustrates an exemplary computing system that may be used to implement a node, a virtual machine or a virtual machine cluster. As shown in FIG. 3B, the computing system may include a processor 310, a storage medium 320, a monitor 330, a communication module 340, a database 350, and peripherals 360. Certain devices may be omitted and other devices may be included.

Processor 310 may include any appropriate processor or processors. Further, processor 310 can include multiple cores for multi-thread or parallel processing. Storage medium 320 may include memory modules, such as ROM, RAM, flash memory modules, and erasable and rewritable memory, and mass storages, such as CD-ROM, U-disk, and hard disk, etc. Storage medium 320 may store computer programs for implementing various processes, when executed by processor 310.

Further, peripherals 360 may include I/O devices such as keyboard and mouse, and communication module 340 may include network devices for establishing connections through the communication network. Database 350 may include one or more databases for storing certain data and for performing certain operations on the stored data, such as database searching.

Figure 4:
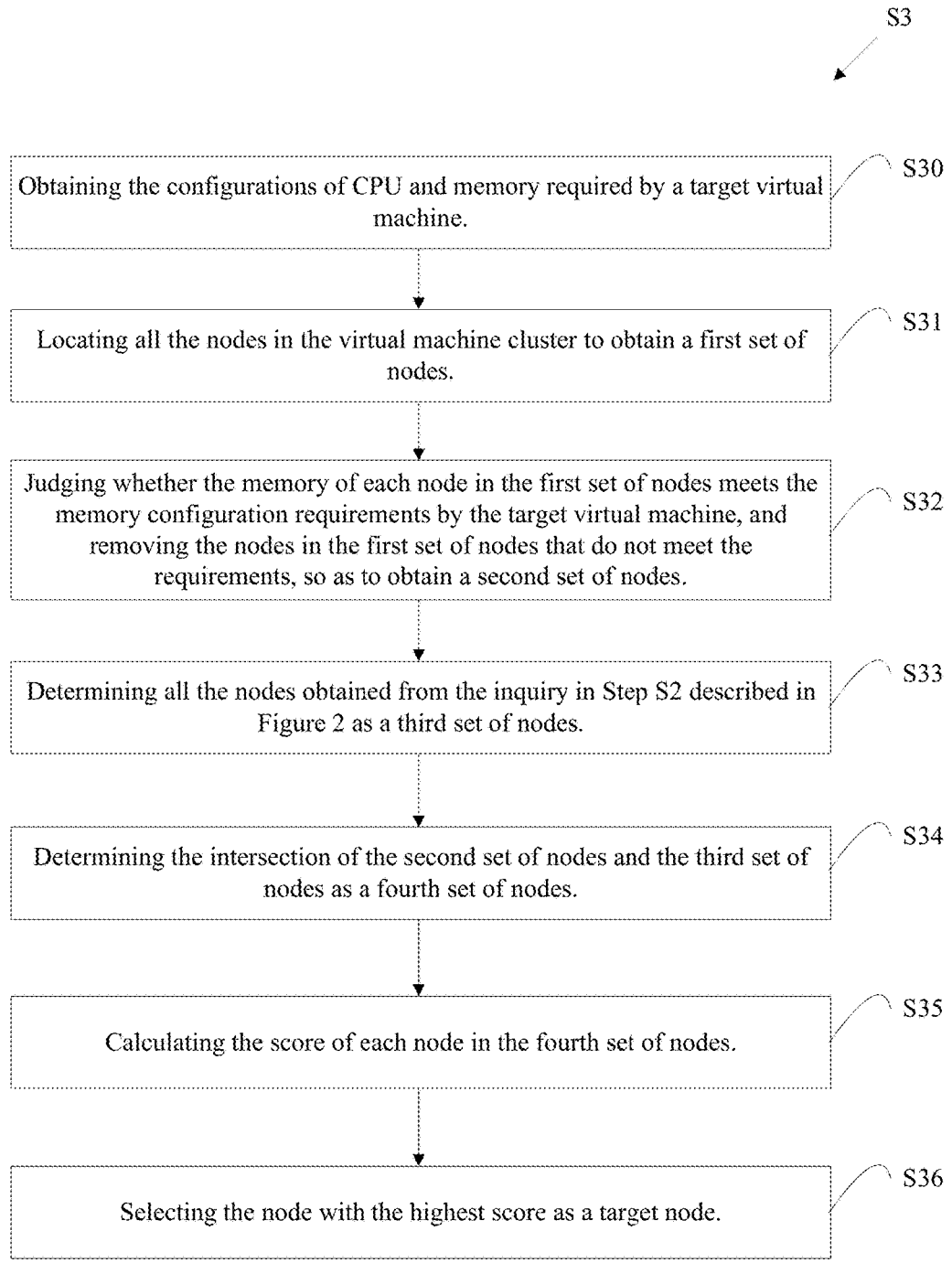
FIG. 4 illustrates a schematic flow chart of Step S3 in FIG. 2, consistent with the disclosed embodiments.

FIG. 4 illustrates an exemplary embodiment of Step S3 in FIG. 2. In this exemplary embodiment, Step S3 includes following steps.

Step S30: obtaining the configurations of CPU and memory required by a target virtual machine, including, for example, the CPU clock frequency and memory size.

Step S31: locating all the nodes in the virtual machine cluster to obtain a first set of nodes. For example, a predetermined algorithm may be used to traverse all the nodes of the cluster to obtain the first set of nodes.

Step S32: judging whether the memory of each node in the first set of nodes meets the memory configuration requirements by the target virtual machine, i.e., judging whether the memory size of each node in the first set of nodes is larger than or equal to the minimum memory size required by the target virtual machine to be run, and removing the nodes in the first set of nodes that do not meet the requirements, so as to obtain a second set of nodes.

Step S33: determining all the nodes obtained from the inquiry in previously described Step S2 as a third set of nodes, i.e., nodes with a copy of the requested target virtual machine.

Step S34: determining the intersection of the second set of nodes and the third set of nodes as a fourth set of nodes.

Step S35: calculating the score of each node in the fourth set of nodes.

Step S36: selecting the node with the highest score as a target node.

In the above exemplary embodiment, Steps S30 to S32 and Step S33 do not have any sequential relationship. One can execute Steps S30 to S32 first, and then execute Step S33; one can also execute Step S33 first, and then execute Steps S30 to S32; or one can also execute Steps S30 to S32 and Step S33 concurrently.

In Step S35, the score of each node in the fourth set of nodes may be calculated according to the following formula:

$$S = F_0/F^*(N+1) - N_0$$

where S is the score of the current node; $F_0$ is the CPU frequency of the current node; F is the sum of the CPU frequencies of all the nodes in the cluster; N is the number of virtual machines in the cluster; and $N_0$ is the number of the virtual machines running on the current node.

Figure 5:
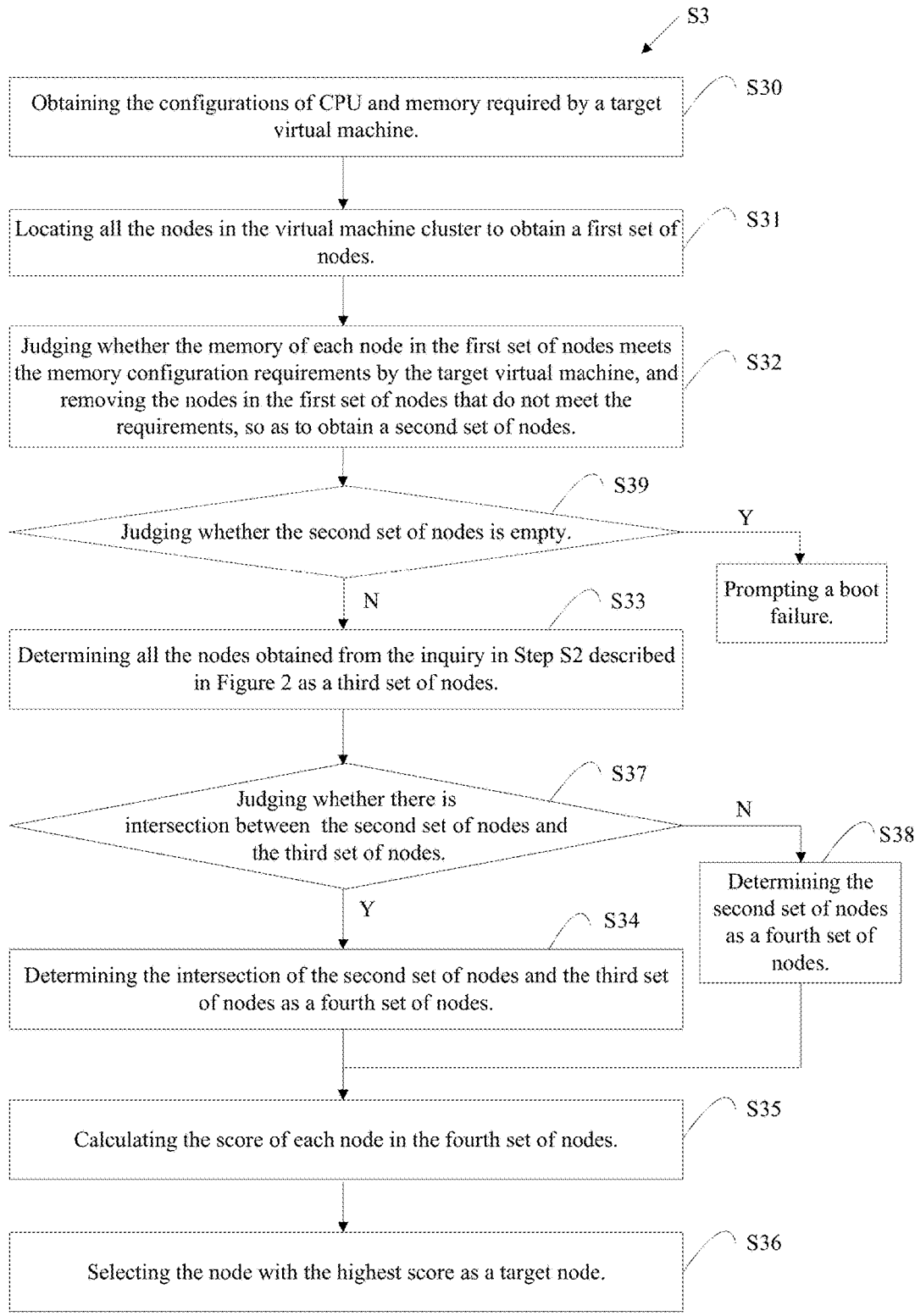
FIG. 5 illustrates another schematic flow chart of Step S3 in FIG. 2, consistent with the disclosed embodiments.

FIG. 5 illustrates another exemplary embodiment of Step S3 in FIG. 2. The differences between the present exemplary embodiment and the exemplary embodiment shown in FIG. 4 may include the followings.

Between Step S33 and Step S34, the present exemplary embodiment further comprises the followings.

Step S37: judging whether there is intersection between the second set of nodes and the third set of nodes. If there is no intersection between the second set of nodes and the third set of nodes, there are no nodes that have the capability to start the target virtual machine in the set of nodes where copies of the target virtual machine are located, and the process goes to Step S38. If there is intersection between the second set of nodes and the third set of nodes, there are nodes that have the capability to start the target virtual machine in the set of nodes where copies of the virtual machine are located, and the process goes to Step S34.

Step S38: determining the second set of nodes as a fourth set of nodes, and then going to Step S35.

In addition, between Step S32 and Step S33, the present exemplary embodiment further comprises the followings.

Step S39: judging whether the second set of nodes is empty. If the second set is empty, i.e., there are no nodes in the cluster that can run the target virtual machine, the process prompts a boot failure. If the second set of nodes is not empty, there are nodes in the cluster that can run the target virtual machine, and the process goes to Step S33.

In addition, returning to FIG. 4, after Step S4, the present exemplary embodiment further comprises judging whether the selected target node belongs to the third set of nodes. If the selected target node does not belong to the third set of nodes, the process goes back to Step S3. If the selected target node belongs to the third set of nodes, the running of the virtual machine continues until the process finishes.

In the present exemplary embodiment, if there is no intersection between the second set of nodes and the third set of nodes, it is necessary to select a node from the second set as a target node to run the target virtual machine, and after the target virtual machine is run, Step S3 may be re-executed.

When a user starts a target virtual machine, the set of nodes where copies of the target virtual machine are located does not have the nodes that have the capability to start the target virtual machine. However, after the target virtual machine is run, if the nodes that have the capability to start the target virtual machine appear in the set of nodes where the copies of the virtual machine are located, Step S3 may be re-executed, so that the running of the target virtual machine on a node that does not belong to the third set of nodes can migrate in real time to a node in the third set of nodes. A node in the third set of nodes is a node where a copy of the virtual machine is located.

Figure 6:
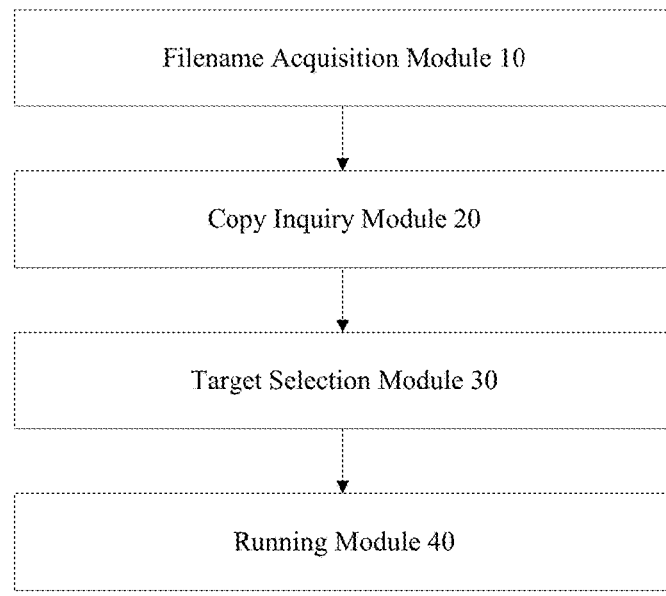
FIG. 6 illustrates a logic chart of an exemplary system for scheduling virtual machines in an integrated virtual machine cluster, consistent with the disclosed embodiments.

FIG. 6 illustrates an exemplary system for scheduling virtual machines in an integrated virtual machine cluster. The virtual machine scheduling system includes following parts that are connected successively: a filename acquisition module 10, a copy inquiry module 20, a target selection module 30, and a running module 40.

The filename acquisition module 10 is configured to acquire the filename of a target virtual machine when a user starts the target virtual machine. The copy inquiry module 20 is configured to inquire, based on the filename of a target virtual machine, a storage module or a database for nodes where copies of the target virtual machine are located. The target selection module 30 is configured to, from the nodes obtained from an inquiry by the copy inquiry module 20, select the node with the highest score as a target node. The running module 40 is configured to run a target virtual machine on a selected target node. Detailed functions and steps performed by these modules are described above and are omitted here.

Figure 7:
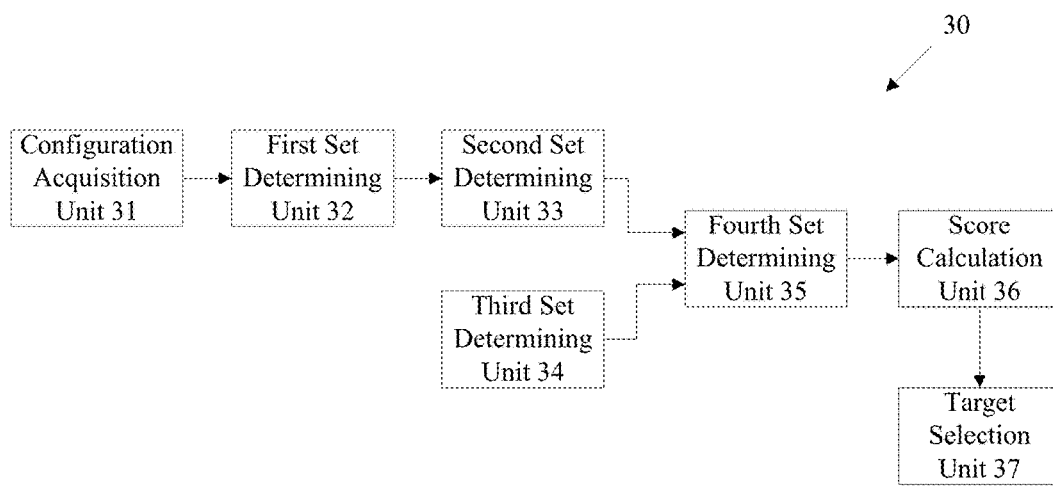
FIG. 7 illustrates a logic chart of an exemplary target selection module consistent with the disclosed embodiments.

FIG. 7 illustrates an exemplary target selection module 30 shown in FIG. 6. In the present exemplary embodiment, the target selection module 30 includes a configuration acquisition unit 31, a first set determining unit 32, a second set determining unit 33, a third set determining unit 34, a fourth set determining unit 35, a score calculation unit 36, and a target selection unit 37.

The configuration acquisition unit 31 is configured to acquire the configurations of CPU and memory required by a target virtual machine. The first set determining unit 32 is configured to locate all the nodes in the cluster to get a first set of nodes. The second set determining unit 33 is configured to judge whether the memory of each node in a first set of nodes meets the configuration requirements by a target virtual machine, and remove the nodes in the first set of nodes that do not meet the requirements, so as to obtain a second set of nodes. The third set determining unit 34 is configured to determine all the nodes acquired by the copy inquiry module 20 as a third set of nodes. The fourth set determining unit 35 is configured to determine the intersection of a second set of nodes and a third set of nodes as a fourth set of nodes. The score calculation unit 36 is configured to calculate the score of each node in a fourth set of nodes. The target selection unit 37 is configured to select the node with the highest score as a target node.

In certain exemplary embodiments, the target selection module 30 may further include an intersection determining unit, an empty set determining unit, and a prompting unit. The intersection determining unit, connected to a second set determining unit 33, a third set determining unit 34 and a fourth set determining unit 35, is configured to determine whether there is an intersection between a second set of nodes and a third set of nodes. If the intersection judging unit judges that there is an intersection between a second set of nodes and a third set of nodes, the fourth set determining unit 35 determines the intersection between a second set of nodes and a third set of nodes as a fourth set of nodes. If the intersection judging unit judges that there is no intersection between a second set of nodes and a third set of nodes, the fourth set determining unit 35 determines the second set of nodes as a fourth set of nodes. The empty set determining unit, connected to the second set determining unit 33, is configured to determine whether a second set of nodes is empty. If the empty set determining unit determines that a second set of nodes is empty, the prompting unit prompts a boot failure.

In certain embodiments, the target selection module 30 is also configured to run a target virtual machine on a selected target node. Further, if the selected target node does not belong to a third set of nodes, the target selection module 30 may select, from the nodes obtained from an inquiry by the copy inquiry module 20, the node with the highest score as a target node.

If the intersection determination unit determines that there is no intersection between a second set of nodes and a third set of nodes, the fourth set determining unit 35 determines the second set of nodes as a fourth set of nodes, and the score calculation unit 36 calculates the score of each node in the fourth set of nodes. The target selection unit 37 then selects the node with the highest score as a target node, and the running module 40 runs the target virtual machine on the selected target node.

After a target virtual machine is run, the set of nodes where copies of the target virtual machine are located may have nodes with the capability to start the target virtual machine. The target selection module 30 may re-select a target node to run the target virtual machine from the nodes that belong to the set of nodes where copies of the target virtual machine are located and have the capability to start the target virtual machine. In this way, the running of a target virtual machine on a node that does not belong to a third set of nodes may migrate in real time to a node in a third set of nodes, that is, a node where a copy of a target virtual machine node is located.

The score calculation unit 36 may calculate the score of each node in a fourth set of nodes according to the following formula:

$$S=F_0/F*(N+1)-N_0$$

where S is the score of the current node; $F_0$ is the CPU frequency of the current node; F is the sum of the CPU frequencies of all the nodes in the cluster; N is the number of virtual machines in the cluster; and $N_0$ is the number of the virtual machines running on the current node.

The embodiments disclosed herein are exemplary only and not limiting the scope of this disclosure. Various alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A method for scheduling virtual machines in an integrated virtual machine cluster, the method being performed by a computer program executable by a processor, the method comprising:
    S1). obtaining a filename of a target virtual machine from a directory created for the virtual machines when a user requests to start the target virtual machine;
    S2). inquiring, based on the filename of the target virtual machine, a storage module or a database to acquire nodes where copies of the target virtual machine are located, wherein a node is a physical machine or computer for hosting one or more virtual machines;
    S3). selecting, based on a relationship between the acquired nodes where copies of the target virtual machine are located and nodes of the integrated virtual machine cluster that meet a CPU and memory configuration requirement of the target virtual machine, a set of nodes for starting the target virtual machine, and calculating a score for each node in the selected set of nodes to determine a target node; and
    S4). running the target virtual machine on the determined target node,
    wherein (S3) further includes:
        S30). obtaining configurations of CPU and memory required by the target virtual machine,
        S31). locating all nodes in the integrated virtual machine cluster to obtain a first set of nodes,
        S32). judging whether each node in the first set of nodes meets the CPU and memory configuration requirement of the target virtual machine, and removing nodes in the first set of nodes that do not meet the configuration requirement, so as to create a second set of nodes,
        S33). determining the acquired nodes in (S2) as a third set of nodes,
        S34). in response to an intersection existing between the second set of nodes and the third set of nodes, determining the intersection of the second set of nodes and the third set of nodes as a fourth set of nodes,
        S35). calculating a score of each node in the fourth set of nodes, and
        S36). selecting a node with a highest score as the target node, wherein the highest score indicating a highest efficiency for running the target virtual machine on the selected target node.

2. The method according to claim 1 between (S33) and (S34), further including:
  judging whether there is intersection between the second set of nodes and the third set of nodes;
  when there is no intersection between the second set of nodes and the third set of nodes, determining the second set of nodes as the fourth set of nodes, continuing to (S35); and
  when there is intersection between the second set of nodes and the third set of nodes, continuing to (S34).

3. The method according to claim 2, after (S4), further including:
  judging whether the selected target node belongs to the third set of nodes; and
  when the selected target node does not belong to the third set of nodes, continuing to (S3).

4. The method according to claim 1, between (S32) and (S33), further including:
  judging whether the second set of nodes is empty; and
  when the second set of nodes is empty, prompting a boot failure.

5. The method according to claim 1, wherein:
  provided that S is the score of a current node; Fo is CPU frequency of the current node; F is a sum of the CPU frequency of all nodes in the integrated virtual machine cluster; N is a number of virtual machines in the integrated virtual machine cluster; and No is a number of virtual machines running on the current node; the score of each node in the fourth set of nodes is calculated by:

$$S=Fo/F*(N+1)-No.$$

6. The method according to claim 1, wherein (S35) further includes: calculating the score of each node in the fourth set of nodes based on parameters including a number of virtual machines running on the node.

7. A system for scheduling virtual machines in an integrated virtual machine cluster, comprising at least one processor, the at least one processor being configured to:
  acquire a filename of a target virtual machine from a directory created for the virtual machines when a user requests to start the target virtual machine;
  based on the filename of the target virtual machine, inquire a storage module or a database to acquire nodes where copies of the target virtual machine are located, wherein a node is a physical machine or computer for hosting one or more virtual machines;
  based on a relationship between the acquired nodes where copies of the target virtual machine are located and nodes of the integrated virtual machine cluster that meet a CPU and memory configuration requirement of the target virtual machine, select a set of nodes for starting the target virtual machine;
  calculating a score for each node in the selected set of nodes to determine a target node; and
  run the target virtual machine on the determined target node;
  wherein further includes:
    obtaining configurations of CPU and memory required by the target virtual machine;
    locating all nodes in the integrated virtual machine cluster to obtain a first set of nodes;
    judging whether each node in the first set of nodes meets the CPU and memory configuration requirement of the target virtual machine, and removing nodes in the first set of nodes that do not meet the configuration requirement, so as to create a second set of nodes;
    determining the acquired nodes in (S2) as a third set of nodes;
    in response to an intersection existing between the second set of nodes and the third set of nodes, determining the intersection of the second set of nodes and the third set of nodes as a fourth set of nodes;
    calculating a score of each node in the fourth set of nodes; and
    selecting a node with a highest score as the target node, wherein the highest score indicating a highest efficiency for running the target virtual machine on the selected target node.

8. The system according to claim 7, wherein the at least one processor is further configured to:
  determine whether there is intersection between the second set of nodes and the third set of nodes; and
  when there is intersection between the second set of nodes and the third set of nodes, determine the intersection between the second set of nodes and the third set of nodes as a fourth set of nodes and, when there is no intersection between the second set of nodes and the third set of nodes, determine the second set of nodes as the fourth set of nodes.

9. The system according to claim 8, wherein the at least one processor is further configured to, after running the target virtual machine on the selected target node, judge whether the selected target node belongs to the third set of nodes, and when the selected target node does not belong to the third set of nodes, re-select a set of nodes for starting the target virtual machine based on the relationship between the acquired nodes where copies of the target virtual machine are located and the nodes of the integrated virtual machines that meet the CPU and memory configuration requirement of the target virtual machine, and calculate a score for each node in the re-selected set of nodes to determine another target node as the target node.

10. The system according to claim 7, wherein the at least one processor is further configured to:
  determine whether the second set of nodes is empty; and
  when the second set of nodes is empty, prompt a boot failure.

11. The system according to claim 7, wherein:
  provided that S is the score of a current node; Fo is CPU frequency of the current node; F is a sum of the CPU frequency of all nodes in the integrated virtual machine cluster; N is a number of virtual machines in the integrated virtual machine cluster; and No is a number of virtual machines running on the current node; the at least one processor is further configured to calculate the score of each node in the fourth set of nodes by:

$$S=Fo/F*(N+1)-No.$$

12. A non-transitory computer-readable medium having computer program for, when being executed by a processor, performing a method for scheduling virtual machines in an integrated virtual machine cluster, the method comprising:
  S1). obtaining a filename of a target virtual machine from a directory created for the virtual machines when a user requests to start the target virtual machine;
  S2). inquiring, based on the filename of the target virtual machine, a storage module or a database to acquire nodes where copies of the target virtual machine are located, wherein a node is a physical machine or computer for hosting one or more virtual machines;

S3). selecting, based on a relationship between the acquired nodes where copies of the target virtual machine are located and nodes of the integrated virtual machine cluster that meet a CPU and memory configuration requirement of the target virtual machine, a set of nodes for starting the target virtual machine, and calculating a score for each node in the selected set of nodes to determine a target node; and S4). running the target virtual machine on the determined target node, wherein (S3) further includes:
S30). obtaining configurations of CPU and memory required by the target virtual machine,
S31). locating all nodes in the integrated virtual machine cluster to obtain a first set of nodes,
S32). judging whether each node in the first set of nodes meets the CPU and memory configuration requirement of the target virtual machine, and removing nodes in the first set of nodes that do not meet the configuration requirement, so as to create a second set of nodes,
S33). determining the acquired nodes in (S2) as a third set of nodes,
S34). in response to an intersection existing between the second set of nodes and the third set of nodes, determining the intersection of the second set of nodes and the third set of nodes as a fourth set of nodes,
S35). calculating a score of each node in the fourth set of nodes, and
36). selecting a node with a highest score as the target node, wherein the highest score indicating a highest efficiency for running the target virtual machine on the selected target node.

13. The non-transitory computer-readable medium according to claim 12, between (S33) and (S34), the method further including:
   judging whether there is intersection between the second set of nodes and the third set of nodes;
   when there is no intersection between the second set of nodes and the third set of nodes, determining the second set of nodes as the fourth set of nodes, continuing to (S35); and
   when there is intersection between the second set of nodes and the third set of nodes, continuing to (S34).

14. The non-transitory computer-readable medium according to claim 13, after (S4), the method further including:
   judging whether the selected target node belongs to the third set of nodes; and
   when the selected target node does not belong to the third set of nodes, continuing to (S3).

15. The non-transitory computer-readable medium according to claim 12, between (S32) and (S33), the method further including:
   judging whether the second set of nodes is empty; and
   when the second set of nodes is empty, prompting a boot failure.

16. The non-transitory computer-readable medium according to claim 12, wherein:
   provided that S is the score of a current node; Fo is CPU frequency of the current node; F is a sum of the CPU frequency of all nodes in the integrated virtual machine cluster; N is a number of virtual machines in the integrated virtual machine cluster; and No is a number of virtual machines running on the current node; the score of each node in the fourth set of nodes is calculated by:

$S = Fo/F*(N+1) - No.$

* * * * *